United States Patent
Hurley et al.

(10) Patent No.: US 8,115,659 B2
(45) Date of Patent: Feb. 14, 2012

(54) METHOD AND APPARATUS FOR EFFICIENT GATHERING OF INFORMATION IN A MULTICORE SYSTEM

(75) Inventors: Paul T. Hurley, Zurich (CH); Sean Rooney, Zurich (CH); Tomas Tuma, Zlin (CZ)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 12/136,187

(22) Filed: Jun. 10, 2008

(65) Prior Publication Data

US 2009/0307697 A1    Dec. 10, 2009

(51) Int. Cl.
*H03M 7/30* (2006.01)
(52) U.S. Cl. ............................................. 341/87; 341/50
(58) Field of Classification Search .................. 341/50, 341/87
See application file for complete search history.

(56) References Cited

U.S. PATENT DOCUMENTS

| 6,094,710 A * | 7/2000 | Arimilli et al. ............ 711/153 |
| 6,879,270 B1 * | 4/2005 | Veazey ..................... 341/87 |
| 7,271,747 B2 * | 9/2007 | Baraniuk et al. ............. 341/87 |

OTHER PUBLICATIONS

D.L. Donoho, "Compressed Sensing," Information Theory, IEEE Transactions, www-stat.stanford.edu/~donoho/Reports/2004/CompressedSensing091604.pdf, Sep. 2004, pp. 1-34, vol. 52, Issue 4.

E. Candes et al., "Robust Uncertainty Principles: Exact Signal Reconstruction from Highly Incomplete Frequency Information," IEEE Transactions on Information Theory, www.acm.caltech.edu/~emmanuel/papers/ExactRecovery.pdf, Aug. 2005, pp. 1-41, vol. 52, No. 2.

M.F. Duarte et al., "Single-Pixel Imaging via Compressive Sampling," IEEE Signal Processing Magazine, Special Issue on Compressive Sampling, www.dsp.ece.rice.edu/cs/csCamera-SPMag-web.pdf, Mar. 2008, pp. 1-19.

Intel® Itanium® 2 Processor Reference Manual for Software Development and Optimization, Intel Product Manual, May 2004, pp. 1-196.

Intel® Technology Journal, Nov. 2007, 117 pages, vol. 11, Issue 4.

\* cited by examiner

*Primary Examiner* — Khai M Nguyen
(74) *Attorney, Agent, or Firm* — Stephen C. Kaufman; Ryan, Mason & Lewis, LLP

(57) ABSTRACT

Methods and apparatus for gathering information from processors by using compressive sampling are presented. The invention can monitor multicore processor performance and schedule processor tasks to optimize processor performance. Using compressive sampling minimizes processor-memory bus usage by the performance monitoring function. An embodiment of the invention is a method of gathering information from a processor, the method comprising compressive sampling of information from at least one processor core. The compressive sampling produces compressed information. The processor comprises the at least one processor core, and the at least one processor core is operative to process data.

25 Claims, 6 Drawing Sheets

300

500

600

700

800

METHOD AND APPARATUS FOR EFFICIENT GATHERING OF INFORMATION IN A MULTICORE SYSTEM

FIELD OF THE INVENTION

The present invention relates generally to computing devices, and more particularly the invention relates to multicore processor performance optimization using compressive sampling of processor information.

BACKGROUND OF THE INVENTION

A modern day processor may include many core processors, herein termed cores. In such a multicore processor, a scheduler may apportion tasks among the cores. In order to know the availability of core processing cycles, a performance monitor unit (PMU) may be used to monitor the performance of the cores and feed that information to the scheduler. Given the high frequency of processor operation and the multiplicity of cores, the amount of information processed by the PMU and transferred to the scheduler can be large, inefficiently using many processing and data bus (processor-memory) cycles.

The Shannon/Nyquist sampling theorem tells us that in order not to lose information when uniformly sampling a signal, the signal must be sampled at least two times faster than the bandwidth of the signal. In many applications, the Nyquist rate can be so high that there are too many samples and they must be compressed in order to store or transmit them. In other applications, increasing the sampling rate or density beyond the current state-of-the-art is very expensive. Data sampling and data compression has been, generally, a two-step process involving a first step of sampling and possibly storing the data, and a second step of compressing the data. In many applications, a high capacity, high speed data bus is needed to transfer the non-yet-compressed sampled data.

A more general linear measurement scheme coupled with an optimization in order to acquire certain kinds of signals at a rate significantly below the Nyquist rate has been developed. This scheme reduces the number of measurements required to completely describe a signal by exploiting the compressibility of the signal. Thus signal compression occurs during the sampling process. This technique is termed compressive sampling or compressed sensing.

SUMMARY OF THE INVENTION

Principles of the invention provide, for example, circuits, methods and techniques for efficiently gathering information from a multicore processor and for optimizing the performance of the processor using that information. For example, compressive sampling of processor performance allows efficient use of a processor-memory bus to provide performance data to a scheduler for scheduling subsequent processor core tasks.

For example, in accordance with one aspect of the invention, a method is provided for gathering information from a processor. The method comprises compressive sampling of information from at least one processor core. The compressive sampling produces compressed information. The processor comprises the at least one processor core, and the at least one processor core is operative to process data.

In accordance with another aspect of the invention, an apparatus for gathering information from a processor is provided. The apparatus comprises a processor comprising at least one processor core. The at least one processor core is operative to process data. The apparatus further comprises a compressive sampling unit. The compressive sampling unit is operative to perform compressive sampling of information from the at least one processor core, and the compressive sampling unit produces compressed information.

In accordance with yet another aspect of the invention, the apparatus further comprises a scheduler. The scheduler is operative to receive the compressed information, to decompress the compressed information, and to schedule at least one task. The at least one processor core is operative to run the at least one task.

Information gathered from the processor may be, for example, processor performance metrics. Examples of performance metrics are cycles per instruction, bus usage, cache memory misses, and branch misses. Advantages of the invention include, for example, minimal usage of the processor-memory bus associated with obtaining the processor information, and compressive sampling of processor information.

These and other features, objects and advantages of the present invention will become apparent from the following detailed description of illustrative embodiments thereof, which is to be read in connection with the accompanying drawings.

DETAILED DESCRIPTION OF THE INVENTION

Figure 1:
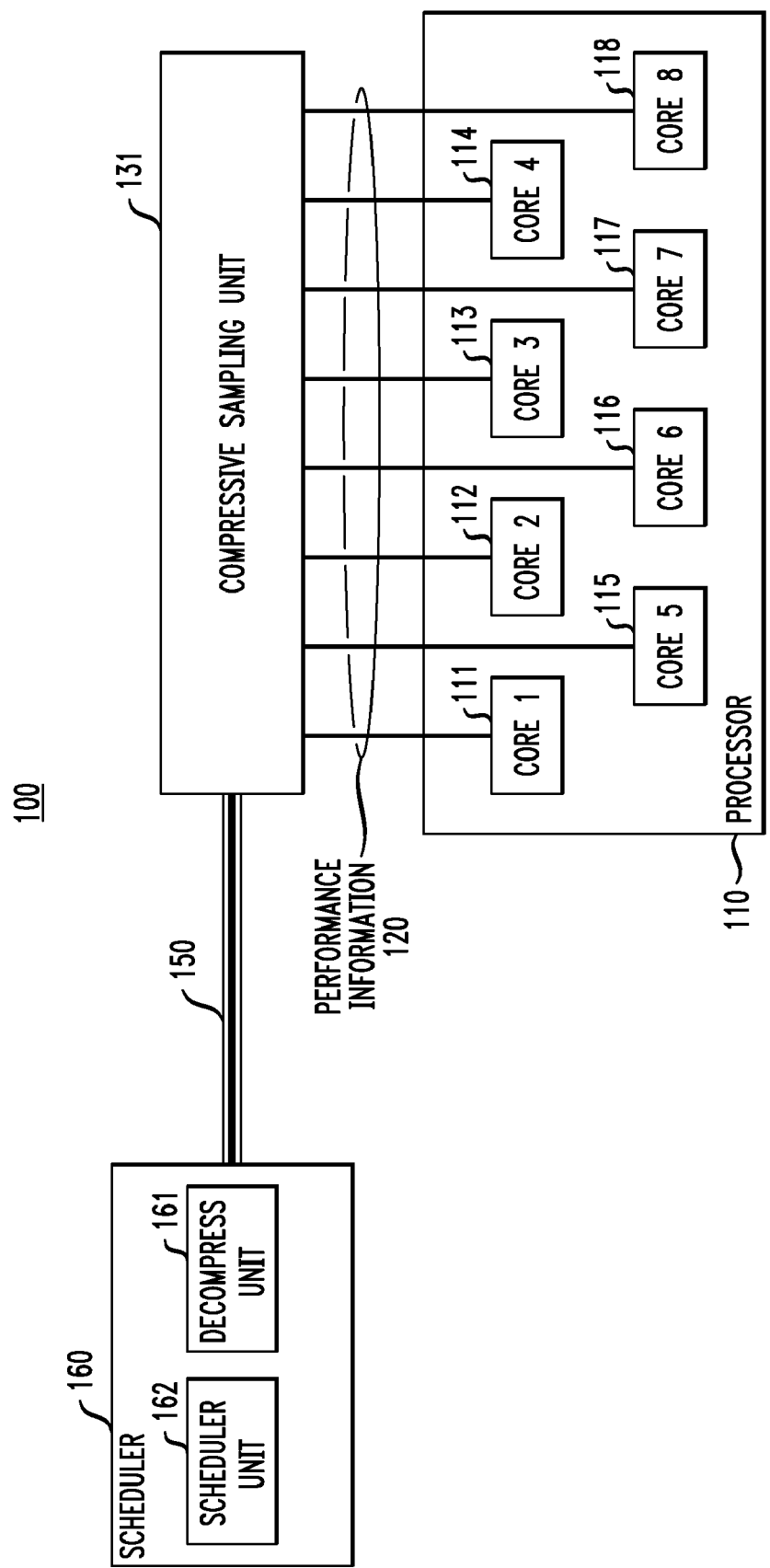
FIG. 1 is an apparatus for monitoring performance and scheduling tasks for a multicore processor according to a first exemplary embodiment of the invention.

A processor is typically a set of units containing logic gates for performing specific operations, for example, arithmetic operations and other data processing operations, coupled with a mechanism for acquiring new instructions and data from memory. The processor and memory are typically coupled by one or more buses. The state of the processor is advanced after every clock cycle. The processor is formed such that underlying physics ensure that the state of the processor is coherent at the end of every clock cycle. The number of clock cycles achievable per second defines the frequency of operation of the processor. For high end processors, the clock can operate at, for example, three billion cycles per second.

Over time, the area that processors occupy has shrunk allowing clock cycles to shorten while still ensuring coherence.

In addition to the basic processing units, additional architectural components and features have been added to allow the average number of instructions executed per clock cycle to be increased. Examples are cache memories, translation lookup blocks (TLB), pipelining, branch prediction logic, and hyper-threading. Layer one cache memories, typically residing within the processor, and Layer two cache memories, typical external to the processor, allow instructions and data that have already been loaded across the bus to be retained in the expectation they will be reused. This reduces the time that the processor is idle or blocked waiting for response from memory. Hardware support for virtual memory allows virtual addresses to be efficiently mapped to actual addresses through the use of TLBs. Pipelining allows multiple instructions to be executed within the same clock cycle. Branch prediction logic guesses the path through the code that the program is going to take. This allows instructions and data to be loaded ahead of time. Hyper-threading supports multiple paths of execution to be intertwined on the same processor. While one thread is blocked awaiting memory response, another thread can continue to use the entire processor.

In summary, modem processors contain multiple interacting parts making it difficult to predict the actual average clock cycles per instruction (CPI) for the execution of a particular piece of code. For example, a set of instructions that modify data with weak locality, that is, data that has not been recently accessed, will be constantly forced to flush their cache memory. The expected performance on the exact same hardware of the exact same sets of instructions on strongly localized data, that is data recently accessed, will be much better.

The unpredictability of CPI information, has led to the introduction of an additional unit within the processor, the Performance Monitor Unit (PMU). The PMU samples the performance of the rest of the processor in order to let application developers identify the bottlenecks in the performance of their applications. The PMU was introduced in the IBM Power PC processor and was relatively simple. For example, the PMU sampled, at a rate of 100 times a second, the program counter identifying the current location in the stack of the instruction being executed. Software running in the operating system (OS) can read this information from the PMU and deliver this information to management applications in order to identify which functions use the most cycles. Modern PMUs, such as that on the Intel Itanium, contain hundreds of counters for indicating, for example, bus usage, cache memory misses, page faults, branch misses and other information, as well as complex logic for determining which of the many pipelined instruction and predicted branches actually cause counters to be increased. The PMU typically resides within the processor and hence uses up processor real estate, increasing the clock cycles, and dissipating heat.

It is generally recognized that processor integrated circuit chips or die will not become physically smaller than they are now. This is due to the even larger heat density that physically smaller processors, having the same or greater processing power, would generate. Consequently, the current trend is not towards faster processors but towards processors containing and interconnecting multiple processors or cores within a chip or die. Such processors are termed multicore processors. Cores within the multicore processor perform specific operations, for example arithmetic operations and other data processing operations.

In the current generation of multicore processors, the processing logic (core) is duplicated a number of times, while the bus and cache memories are shared among them. Current generation multicore processors typically have a relatively small number of multiple cores. Future computer architectures may contain many multicore processors interconnected across a bus. In specialized niches, such as high-end network switches, apparatus with processors having a hundred cores already exist. Within the next ten years, processors having a thousand cores may become commonplace. It is still unclear how such large processor networks will be programmed. In particular, the challenge of determining the correct location to perform distinct tasks in order to maximize performance is daunting. A task scheduler of such a system needs to take into account additional factor when making scheduling decisions.

Additional factors may include, for example, effects of sharing cache memory between tasks, tasks that are writing to the same data, sharing of the memory bus by the processor, and the physical location of memory with respect to processor location. The effect of sharing cache memories between tasks can be positive if they are both executing the same instructions or reading the same data. The effect of sharing cache memories between tasks may be negative, forcing frequent cache memory faults, if there is not enough cache memory space so that the common paths of execution of all the tasks can be simultaneously held in the cache memory. If the tasks are writing to the same data, then the data is constantly being marked as dirty, that is, outdated, inaccurate or error-filled. The processors share the memory bus. This means that simultaneous execution of tasks that require a large amount of bandwidth of the memory bus can be less efficient that a different mix of tasks. It may be better to execute all tasks belonging to the same application simultaneously or not simultaneously, depending on how the tasks interact. As large systems will have multiple areas of memory, memory access will become non-uniform. This means that it may be preferential to execute a task closer to the memory it accesses.

Whatever algorithms are chosen, it is clear that the processor PMUs need to supply more information to the scheduler than is currently the case. Moreover, unlike the current application, where fine tuning is only done for specialized application, the fine tuning process will become a normal part of the OS and may be done dynamically for arbitrary mixes of application.

The problem is made more difficult because it is desirable to keep the logic of the PMU relatively simple in order to reduce the area of the core that the logic occupies, it is desirable for the software extracting data from the PMUs not to consume too many cycles; and it is desirable for the distribution of data from PMUs to a centralized scheduler running on one of the processors not to use too much memory bus bandwidth. Currently, the Intel Itanium-2 processor has more than one hundred counters of forty-eight bit each. Assuming they are sampled one hundred times a second and that there are one thousand processors, then the counters alone would consume 480 Megabits per second of memory bus bandwidth (100 counters×48 bits×100/second×1000 processors). In comparison, the fastest current buses such as PC1-X have a bandwidth of ten Gigabits per second.

One would expect data from the PMU to be heavily structured because behavior of threads in the recent pass is likely to resemble present behavior. Therefore, data from the PMU should be compressible. This would be difficult to achieve using standards compressions techniques without increasing the amount of storage within the PMU and introducing delays inappropriate with the needs of scheduling. However, as described herein, the method of combining compression and sampling into one single operation is advantageous in obtaining processor performance data. This method is termed compressive sampling.

The term compressive sampling, as used herein, means the process of compressing a signal directly in the sampling phase in such a way that only the data that suffice to reconstruct the original signal is sampled, transferred or stored. Following are examples of methods and procedures for compressive sampling and associated decompression. However, the invention is not limited to the methods of these examples, but can be implemented by any method that accomplishes the process of compressing a signal directly in the sampling phase in such a way that only the data that suffice to reconstruct the original signal is sampled, transferred or stored.

Compressive sampling (CS) is a method which allows the entire information content of certain types of signal to be captured in a small number of random projections of that signal. A necessary condition for compressive sampling is that the signal is sparse, i.e., a set of orthonormal basis functions that can be used to represent the signal, have mainly zero coefficients. A signal is termed K-sparse if all of the basis functions have at most K non-zero coefficients. If a signal is K-sparse, it can be efficiently captured in 4*K randomly chosen projections and faithfully recovered.

A sparse set of polynomials can be efficiently represented by their most important coefficients. However, determining which coefficients these are normally involves much calculation. What CS achieves is identifying the most important coefficients without capturing the entire signal. It does this by ensuring that the basis in which the signal is represented and the basis in which it is measured are incoherent, i.e. they have no correlation between them. The signal is then the matrix product of these two basis and a vector of coefficients. The coefficients are the compressed/sampled representation of the signal and can then be efficiently transmitted. The actual signal is recovered, with very high probability of correctness, from these coefficients through the solving of a linear program whose complexity is $O(N^3)$.

If the nature of the signal is known, it has always been possible to sample only the most important aspects of the signal to get an immediately compressed form. What is unique about CS is that the system is non-adaptive, i.e., no advanced knowledge is required about the signal.

Compressive sampling and the associated reconstruction of the original signal by decompression is presented in more detail in the following. Traditionally, signal sampling and compression phases are treated separately. First, the signal is sampled. After sampling, a compression is applied. In many cases, this sequential process involves collection and storage of the entire sampled signal, or a substantial portion of the sampled signal. The sampled signal, or the portion thereof, is then compressed. During compression a substantial part of the sampled signal is discarded. Compressive sampling compresses the signal directly in the sampling phase in such a way that only the data that suffice to reconstruct the original signal is sampled, transferred or stored. Assuming that there are certain assumptions met, compressive sampling guarantees that a signal can be sampled directly in its compressed form, transferred and recovered accurately with very high probability.

Compressive Sampling is based on the principle that a small collection of non-adaptive linear measurements of a compressible signal contains enough information for reconstruction of the uncompressed signal.

A traditional approach to digital data acquisition samples an analog signal uniformly at or above the Nyquist rate. For example, in a digital camera, the samples are obtained by a two-dimensional array of N pixels within an image sensor. These samples are represented using the vector x with elements x[n], n=1, 2, . . . N. Since N is often very large, for example, a million or more, the raw image data x is often compressed in the following multi-step transform coding process.

The first step in transform coding represents the image in terms of the coefficients $\{\alpha_i\}$ of an orthonormal basis expansion $$x = \sum_{i=1}^{N} \alpha_i \psi_i$$

where $$\{\psi_i\}_{i=1}^{N}$$

are the N×1 basis vectors. Forming the coefficient vector $\alpha$ and the N×N basis matrix $\Psi:=[\psi 1|\psi 2| \ldots |\psi N]$ by stacking the vectors $\{\psi_i\}$ as columns, the samples can concisely be written as $x=\Psi\alpha$. The aim is to find a basis where the coefficient vector $\alpha$ is sparse (where only K<<N coefficients are nonzero) or r-compressible (where the coefficient magnitudes decay under a power law with scaling exponent -r). The second step in transform coding encodes only the values and locations of the K significant coefficients and discards the rest.

This sample-then-compress process suffers from inherent inefficiencies. For example, there is a potentially large number of samples N even if the ultimate desired K is small; the encoder must compute all of the N transform coefficients $\{\alpha_i\}$, even though it will discard all but K of them; the encoder faces the overhead of encoding the locations of the large coefficients; potentially large memories are needed to store sampled information before compressing; and significant memory-processor bus bandwidth may be needed to move data from memory to the circuit or processor performing the compression.

Compressive sampling bypasses the separate sampling process and directly acquires a condensed representation of the signal, for example processor performance information, using M<N linear measurements between x and a collection of test functions $$\{\phi_m\}_{m=1}^{M} \text{ as in } y[m] = \langle x, \phi_m \rangle.$$

Stacking the measurements y[m] into the M×1 vector y and the test functions $\phi_m^T$ as rows into an M×N matrix $\Phi$, the follow can be written:

$$y = \Phi x = \Phi \Psi \alpha.$$

The measurement process is non-adaptive in that $\Phi$ does not depend in any way on the signal x. y represents, in compressed form, for example, processor performance information.

The transformation from x to y is a dimensionality reduction, so that in general, the transformation loses information. In particular, since M<N, given y, there are infinitely many x' such that $\Phi x'=y$. An important feature of compressive sampling is that $\Phi$ can be designed such that sparse compressible x can be recovered exactly or approximately from the measurements y.

A choice for $\Phi$ that works with high probability is a random matrix. For example, the elements of $\Phi$ can be independent and identically distributed (i.i.d.) +/−1 random variables from a uniform Bernoulli distribution. Then, the measurements y are merely M different randomly signed linear combinations of the elements of x. Other possible choices include i.i.d., zero-mean, 1/N-variance Gaussian entries (white noise), randomly permuted vectors from standard orthonormal bases, or random subsets of basis vectors, such as Fourier, Walsh-Hadamard, or Noiselet bases. The latter choices enable more efficient reconstruction through fast algorithmic transform implementations. In practice, a pseudo-random Φ driven by a pseudo-random number generator is often used.

Using the Λ1 optimization $$\hat{\alpha} = \operatorname{argmin} \|\alpha'\|_1 \text{ such the } \Phi\Psi\alpha' = y,$$

K-sparse vectors can be exactly reconstructed and compressible vectors can be closely approximated stably with high probability using just M≧O(K log(N/K)) random measurements. This is a convex optimization problem that conveniently reduces to a linear program known as basis pursuit. There are a range of alternative reconstruction techniques based on greedy, stochastic, and variational algorithms. In this way, the original signal, for example, processor performance information, can be reconstructed.

Tutorials on compressive sampling are provided in these three references (the disclosures of which are incorporated herein by reference): E. Candes, et al., "Robust uncertainty principles: Exact signal reconstruction from highly incomplete frequency information," IEEE Trans. Inf. Theory, vol. 52, no. 2, pp. 489-509, 2006; D. Donoho, "Compressed sensing," IEEE Trans. Inf. Theory, vol. 52, no. 4, pp. 1289-1306, 2006; and M. F. Duarte, et al., "Single-Pixel Imaging via Compressive Sampling," http://www.dsp.ece.rice.edu/cs/cs-Camera-SPMag-web.pdf.

Illustrative principles of the invention treat the distinct performance information gathered from the processors as a continuous signal that can be sampled. For example, performance information may be a measure of CPI. The CPI of a processor represents the average number of cycles over some time period required to execute an instruction. Although the actual CPI is a discrete measure, the rate at which it changes, which could be, for example, billions of times a second, is much faster than any realistic sampling period. Therefore, the CPI information can be considered as a continuous function of time. Many different aspects of performance can be similarly treated as continuous signals. One embodiment of the invention uses the compressive sampling technique to sample these signals in compressed form and transmit them over a bus to a dedicated processor which performs as a scheduler.

In an embodiment of the invention, the scheduler decompresses the transmitted compressed form of the signal in order to recreate the signal into the CPI information or other information representing the behavior of the processors. The scheduler uses this decompressed fine grained information to allocate threads to the processors in the next time cycle.

In one embodiment, the compressive sampling aspect of the invention is added as an intrinsic part of the processor core whose performance or other function is being monitored. The basis functions are built as a distinct logical unit within the processor. This solution is extremely efficient, but requires the set of sampled signals to be fixed at the construction of the processor.

In another embodiment, the compressive sampling function is built as programmable logic that is shared by many processor cores whose performance or other function is being monitored.

In yet another embodiment, the compressive sampling function comprises software run on one of a plurality of processor cores whose performance or other function is being monitored. In this embodiment, there may be one or more addition hardware support units to assist in the compressive sampling.

The decompression function of the invention can be built, for example, entirely in hardware, entirely in software, or in software with appropriate hardware assists for solving the linear programming.

FIG. 1 shows an apparatus 100, according to an embodiment of the present invention, for obtaining performance information 120 for a multicore processor 110 using compressive sampling. Processor 110 is a multicore processor including cores 111-118. Although eight cores are shown, the invention is not so limited; the multicore processor can comprise any number of cores. Because of the compressive sampling function, the PMU is replaced by the compressive sampling unit 131. That is, in this embodiment, the compressive sampling unit 131 includes the customary functions of the PMU and the additional function of compressive sampling. Similar to the PMU, the compressive sampling unit 131 may contain a plurality of counters indicating, for example, bus usage, cache memory misses, page faults, branch misses and other information, as well as complex logic for determining which of the many pipelined instruction and predicted branches actually cause counters to be increased. The compressive sampling unit 131 obtains performance information 120 from the cores 111-118 using the method of compressive sampling, for example, the method of compressive sampling explained elsewhere in this specification and in the disclosed references. The compressive sampling unit 131 reads the current updated status of each core as a measurement of the signal in the incoherent basis. The compressive sampling unit 131 forwards compressed information to the scheduler 160 over bus 150. Bus 150 is typically a bus used for coupling processors and memory, i.e., a data bus or a processor-memory bus. Because performance data is transmitted over the bus 150 in compressed form, only a relatively small portion of bus bandwidth is used to send performance data, thus allowing more bus bandwidth for customary data transfers. Scheduler 160 comprises a decompress unit 161 and a scheduler unit 162. The decompress unit 161 decompresses the compressed performance data received from compressive sampling unit 131 recreating uncompressed data representing the performance of the cores 111-118, using, for example, the decompress methods explained elsewhere in this specification and in the disclosed references. The scheduler unit 162 uses this decompressed data to allocate threads and schedule tasks to the cores in the next clock cycle or subsequent clock cycles.

In the embodiment shown in FIG. 1, the compressive sampling unit 131 is shared by many processor cores 111-118 whose performance or other function is being monitored. The compressive sampling unit 131 may contain programmable logic so that the set of sampled signals need not be fixed at the time of fabrication. Alternatively, the compressive sampling unit 131 can be formed from fixed logic or circuits. Furthermore, the compressive sampling unit 131 can be configured to execute software to assist in compression, for example a compression software program.

In the embodiment shown in FIG. 1, the functions of the PMU are performed by the compressive sampling unit 131. In an alternate embodiment, one or more functions of the PMU could be separated from the compressive sampling unit and a PMU could optionally be added to the configuration shown in FIG. 1. In this embodiment, the PMU would be coupled to the compressive sampling unit 131.

Figure 2:
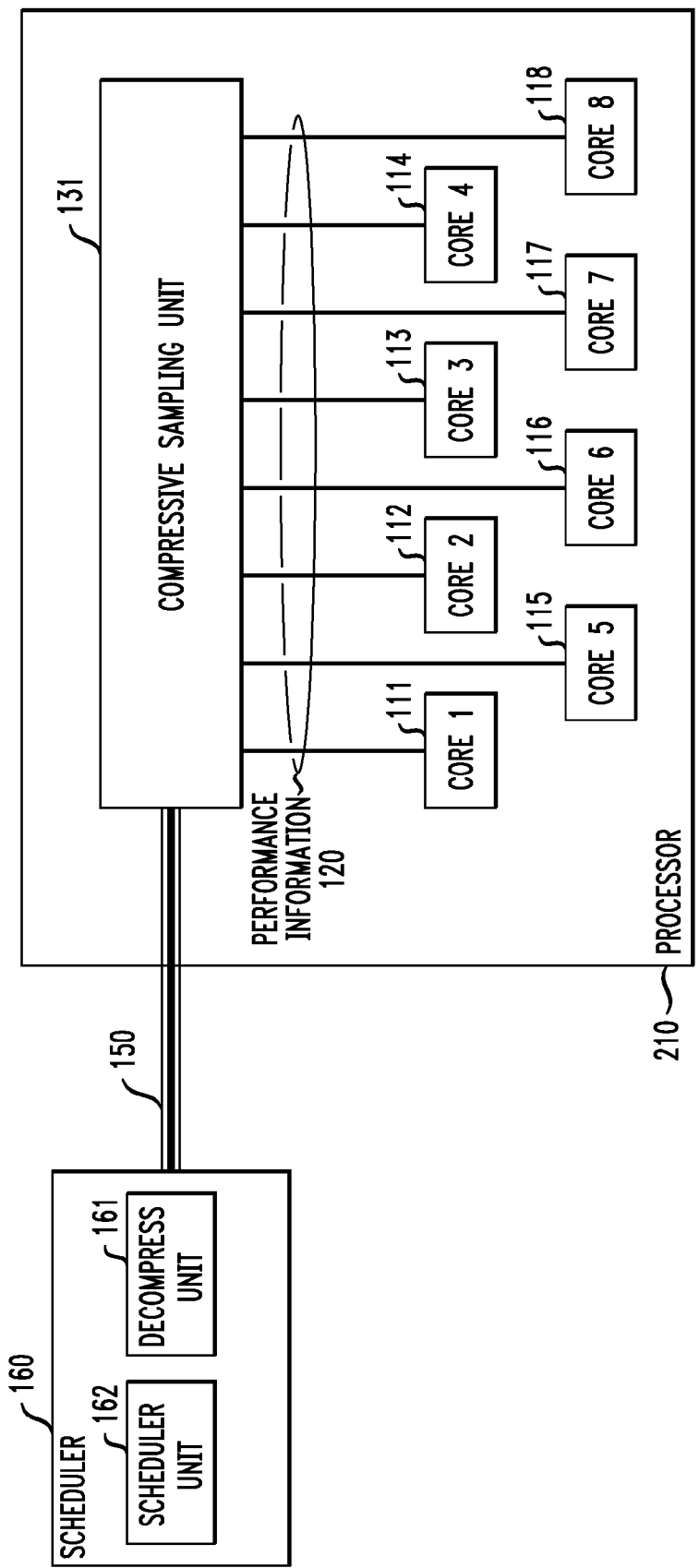
FIG. 2 is an apparatus for monitoring performance and scheduling tasks for a multicore processor according to a second exemplary embodiment of the invention.

FIG. 2 shows an apparatus 200, which is similar to apparatus 100, except that the processor 210 of apparatus 200 includes not only the cores 111-118, but also the compressive sampling unit 131.

Figure 3:
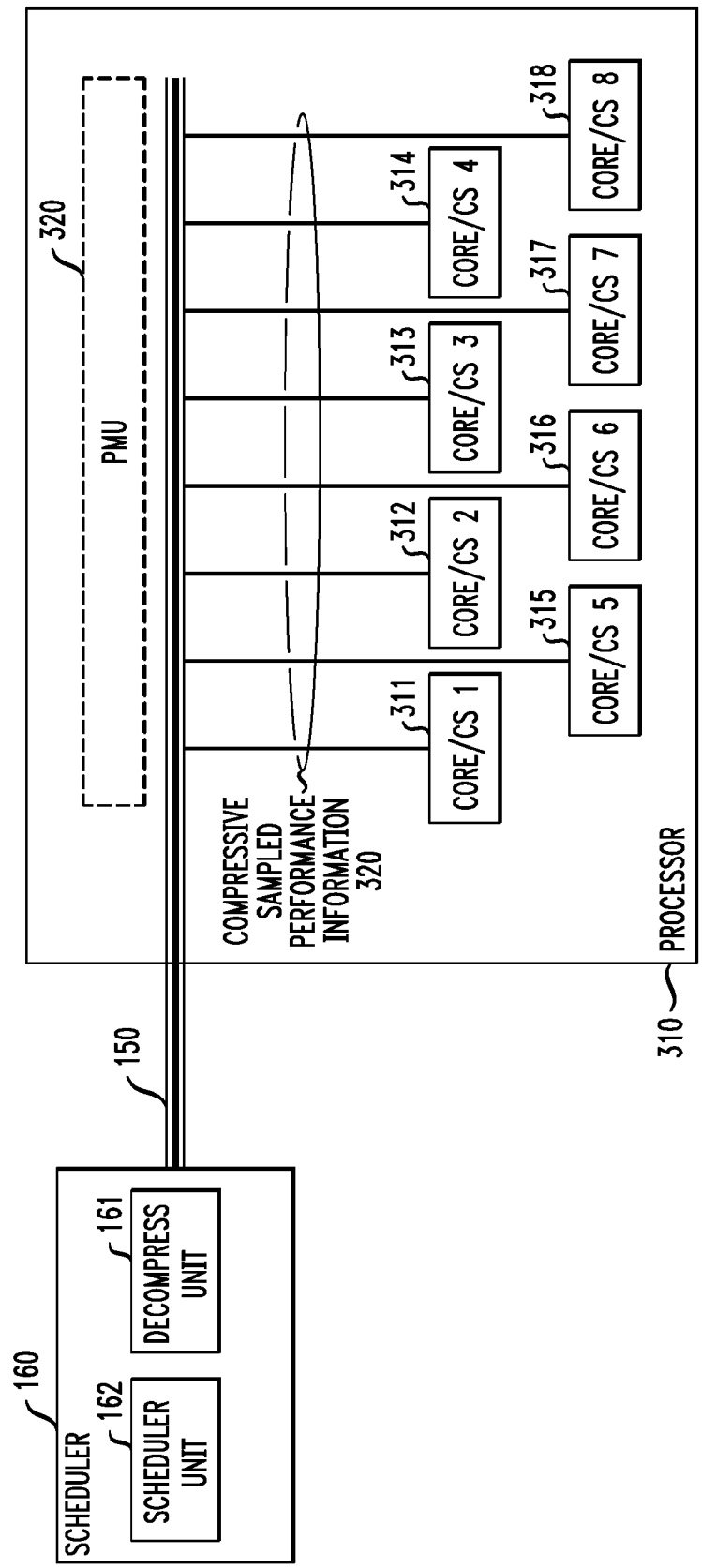
FIG. 3 is an apparatus for monitoring performance and scheduling tasks for a multicore processor according to a third exemplary embodiment of the invention.

FIG. 3 shows an apparatus 300, where the cores perform the compressive sampling function as well as their customary processing functions. The cores that also perform the compressive sampling are labeled core/cs 311-318. The compressive sampled performance information 320 feeds a bus 150 to transport the compressive sampled information to the scheduler 160. As in apparatus 100, the scheduler 160 comprises decompression unit 161 and scheduler unit 162. In an alternate configuration, a PMU 320 is included. It is coupled to the core/cs units 311-318 and to the bus 150.

Figure 4:
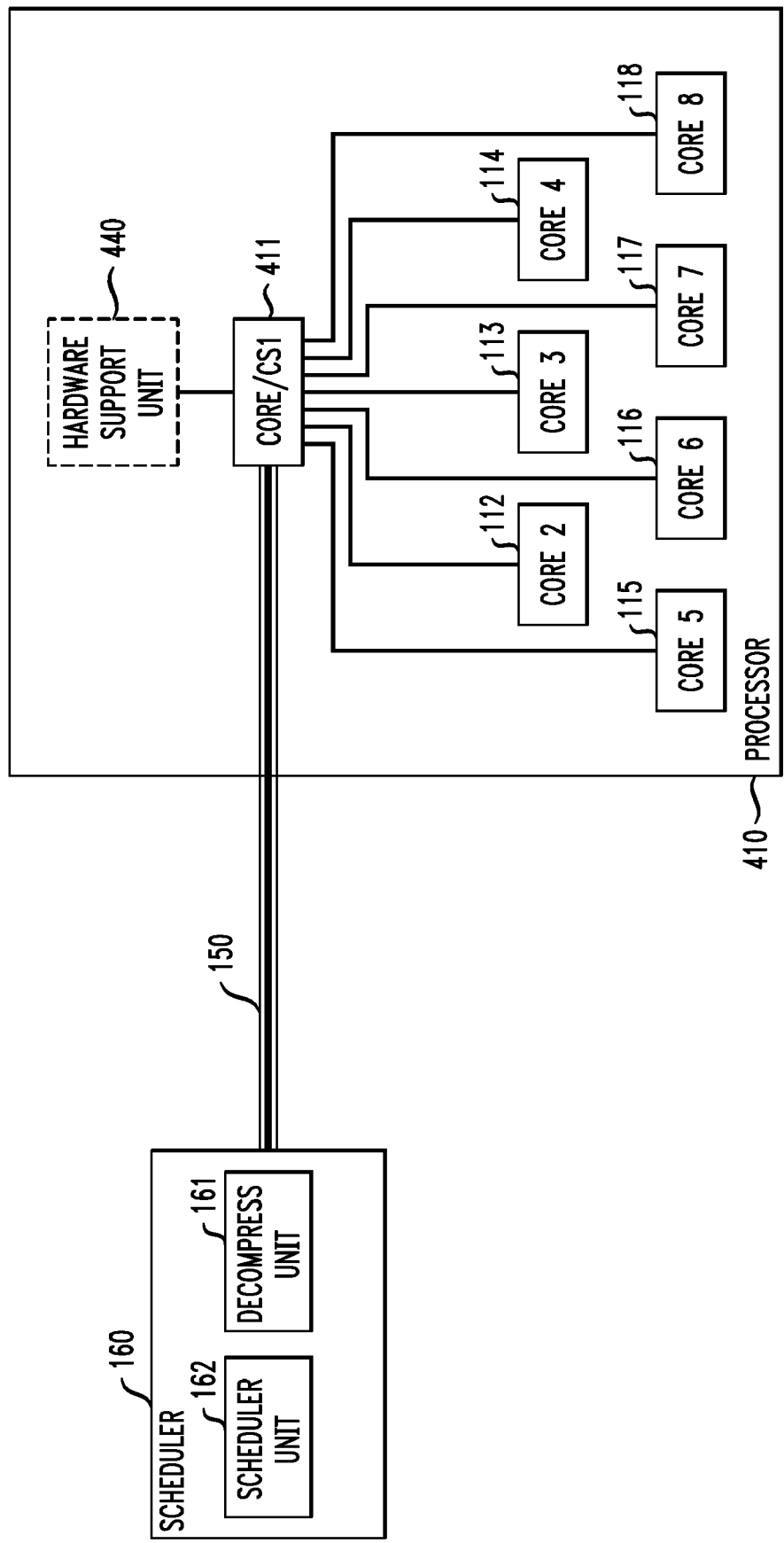
FIG. 4 is an apparatus for monitoring performance and scheduling tasks for a multicore processor according to a fourth exemplary embodiment of the invention.

FIG. 4 shows apparatus 400 where the compressive sampling for all cores 112-118 is performed by core/cs 411. Core/cs 411 may also perform routine processing functions in addition to the compressive sampling function for cores 112-118. Core/cs 411 may also perform the compressive sampling function for itself. The compressive sampling function may comprise software run core/cs 411. Optionally, there may be an additional hardware support unit 440 to assist in the compressive sampling function. The compressive sampled performance information is provided by core/cs 411 to a bus 150 to transport the compressive sampled information to the scheduler 160. As in apparatus 100, the scheduler 160 comprises decompression unit 161 and scheduler unit 162.

In general, the compressive sampling unit 131 or the core/cs 311-318 and 411 can comprise a non-programmable circuit, a programmable circuit, a reprogrammable circuit, a field programmable gate array circuit or a memory circuit. The compressive sampling unit 131 or the core/cs 311-318 and 411 can comprise a processor core including a dedicated compressive sampling processor core, a circuit within a processor core, or a PMU.

In general, the scheduler 160, including decompression unit 161 and scheduler unit 162, can comprise a scheduler processor core, a scheduler circuit, a programmable scheduler circuit, a reprogrammable scheduler circuit, a scheduler memory circuit, or a scheduler field programmable gate array. Decompression unit 161 may perform the decompression function using hardware, including fixed and/or programmable circuits. Decompression unit 161 may perform the decompression function executing software, for example, a decompression software program. Decompression unit 161 may perform the decompression function using both hardware and executing software.

Figure 5:
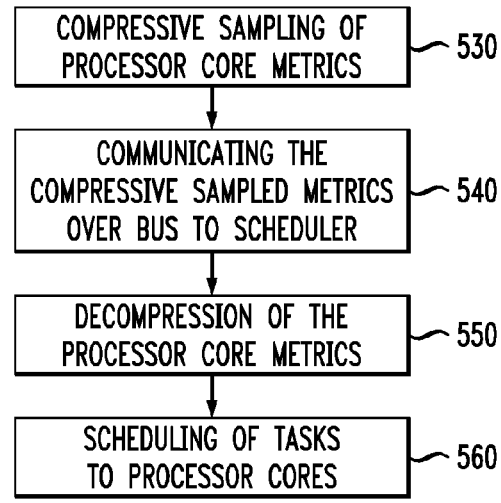
FIG. 5 is a method for monitoring performance and scheduling tasks for a multicore processor according to an exemplary embodiment of the invention.

FIG. 5 illustrates a flow diagram 500 for the method of compressive sampling of core performance metrics according to an embodiment of the present invention. Step 530 is the compressive sampling of the core metrics. The core metrics typically comprise performance information of the cores within a multicore processor. The next step 540 is communicating the compressive sampled metrics over a bus to scheduler. The bus is typically the bus coupling the processor and/or its cores to memory. The next step 550 is decompression of the core metrics. Decompression is typically done within a decompression block within the scheduler. The last step 560 is to schedule tasks to specific cores. The scheduling is typically done by the scheduler. Tasks are typically scheduled for the following clock cycle, but may be scheduled for other subsequent clock cycles.

Figure 8:
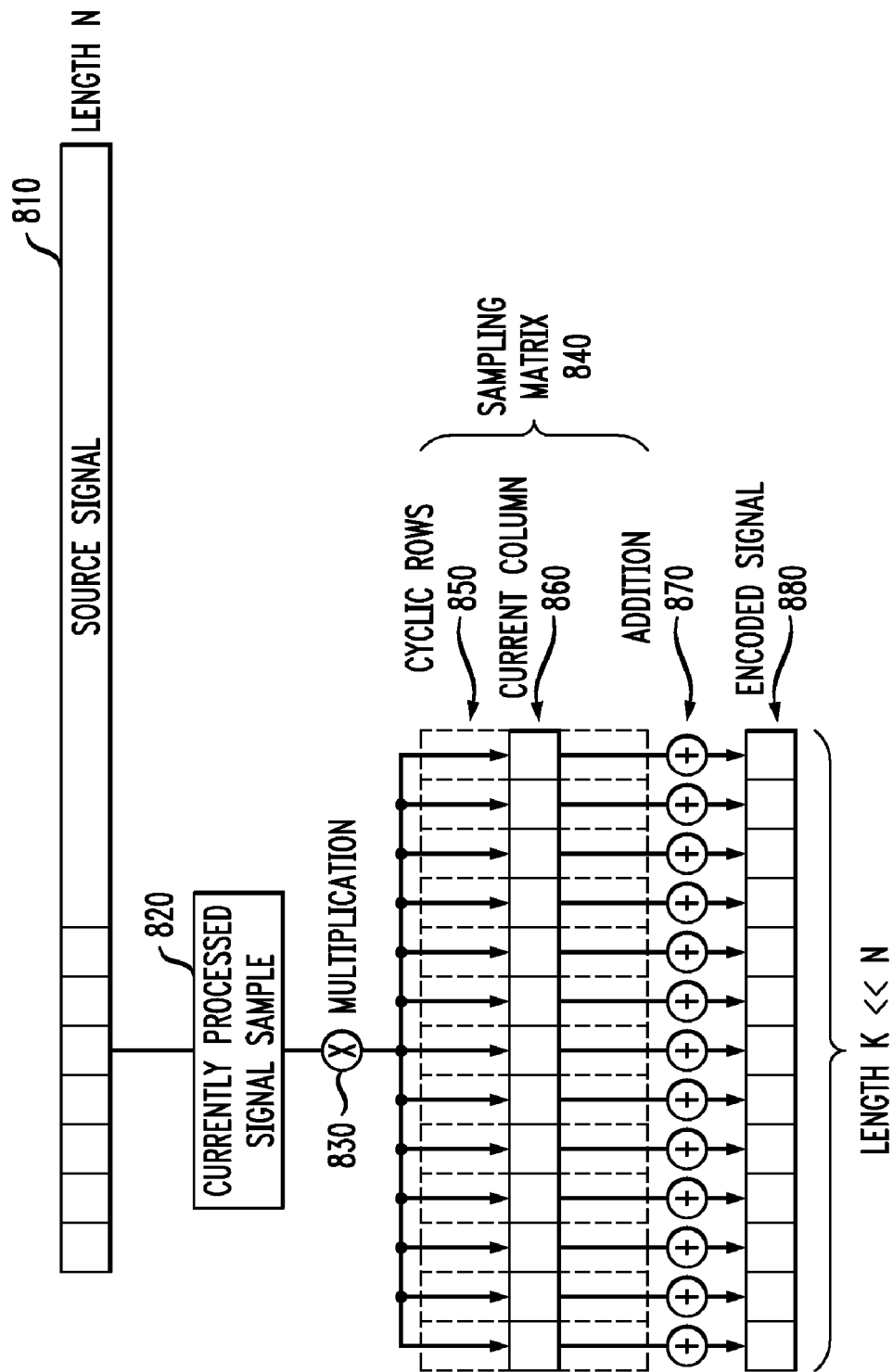
FIG. 8 is an apparatus for performing compressive sampling according to an embodiment of the invention.

This section outlines a method of and apparatus for compressive sampling according to embodiments of the invention. For example, a compressive sampling module 800, shown in FIG. 8, is adapted to perform compressive sampling. The compressive sampling module 800 is intended to be used on per-chip or per-core basis. The module 800 is designed to perform the sampling part of a compressive sampling algorithm, taking a real-valued signal 810 of length n and producing its encoded form 880 of length k, k<n. The signal is sampled periodically in the time domain. The task of the module is to correlate the signal to given sampling matrix 840. The following algorithms exploit the nature of how the signal is obtained as a series of incoming values, and how it is encoded by using matrix multiplication.

More formally, consider signal $f \in R^n$ (810) and sampling matrix A (840) with dimensions k rows×n columns, k<n. Note that this is an "under-sampling" matrix producing vectors in $R^k$. The vector d needs to be obtained:

$$d = A \cdot f.$$

By definition of matrix multiplication, the i-th element of d can be computed as:

$$d_i = \sum_j A_{ij} f_j,$$

that is, by correlating the signal f to the i-th line of sampling matrix. Straightforward computation of d, by evaluating all its coefficients in the described way, requires storing the vector f and traversing its coefficients multiple times. It is better to take one f coefficient at a time, process it and discard it. By processing, it is meant to compute everything needed that takes this coefficient into account. After initializing and storing $d_i := 0$ for $1 < i <= K$, $d_i := d_i + A_{ik} f_j$ for signal values $f_j$, j = 1, ... N can be computed. Therefore, the basic algorithm can be written as:

---
Algorithm 1: Basic algorithm

Data: $f \in R^n$
Result: $d \in R^k$
$d_i := 0$ for i = 1,...k;
for each $f_k$ in f do
    for each $d_i$ in d do
        $d_i := d_i + A_{ij} f_j$;
    end
end
---

The next concern is the multiplication matrix A (840). For given fixed k, only one column 860 of the A matrix is needed to execute the inner for loop. After k is advanced, the column 860 is advanced as well and the old column is no longer needed. Suppose there is a vector a that is a projection of the k-th column of matrix A (840). Then the basic algorithm can be rewritten as:

---
Algorithm 2: Algorithm with a current column vector

Data: $f \in R^n$
Result: $d \in R^k$
$d_i := 0$ for i = 1,...k;
for each $f_k$ in f do
    $a := A_{*k}$;
    for each $d_i$ in d do
        $d_i := d_i + a_i * f_j$;
    end
end
---

In algorithm 2, $A_{*k}$ denotes k-th column (860) of matrix A. In this way, it can be more clearly seen that the inner loop can be parallelized in terms of i, having $f_j$ and a, and that d can be computed in one step provided the additions, performed by addition units 870, and multiplications, performed by multiplication unit 830, run in parallel.

The described algorithm performs encoding of one signal block 810 of length n. After that, the encoded vector d is transferred away and the procedure runs the same way again. An important fact is that the sampling matrix A remains the same for all encoding blocks. Thus, the vector a will be consequently filled with the same values as new $f_k$ samples arrive. From the point of view of a, there is a cycle of a fixed set of values for each $a_i$.

Moreover, it should be possible to exploit special properties of sensing matrices used in compressive sampling so that the value cycle for a can be computed rather than stored. For example, A can be a random matrix with values of −1 and 1 drawn from Gaussian distribution. Unfortunately, because the matrix has to be explicitly known to the recovery algorithm, such a matrix cannot be generated randomly each time. However, an algorithm parameterized by a seed can be generated which would then generate the matrix column values in a cycle. Other possibilities include implementing a noislets basis as a sampling matrix. In this case, basis vectors can be computed by simple recurrent equations.

In one embodiment, matrix A contains a random number sequence. The compressive sampling unit 131 contains a register, which, at one time, contains values from the first column of the matrix A, that is, that part of the random number sequence assigned to the first column of register A. The values stored in the register are used for calculating one of the di values. At a different time, the register contains values from a different column of matrix A that are used for calculating a different di value.

Figure 6:
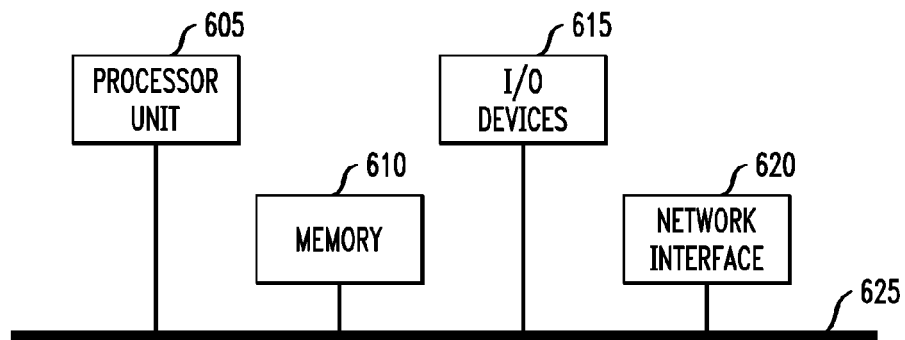
FIG. 6 illustrates a computer system in accordance with which one or more components/steps of the techniques of the invention may be implemented, according to an embodiment of the invention.

FIG. 6 illustrates a computer system 600 in accordance with which one or more components/steps of the techniques of the invention may be implemented. In an embodiment of the invention, processor unit 605 comprises one or more multicore processors, for example, processor 110, 210, 310 or 410, comprising cores scheduled with tasks according to methods of the invention, for example, the method of FIG. 5. In another embodiment of the invention, processor unit 605 further comprises scheduler 160. It is to be further understood that the individual components/steps of the invention may be implemented on one such computer system or on more than one such computer system. In the case of an implementation on a distributed computing system, the distributed computer system may comprise one or more computer systems implementing aspects of the invention. The individual computer systems and/or devices may be connected via a suitable network, e.g., the Internet or World Wide Web. However, the system may be realized via private or local networks. In any case, the invention is not limited to any particular network. Thus, the computer system shown in FIG. 6 may represent one or more servers, or one or more other processing devices capable of providing all or portions of the functions described herein.

The computer system may generally include a processor unit 605, memory 610, input/output (I/O) devices 615, and network interface 620, coupled via a computer bus 625 or alternate connection arrangement.

It is to be appreciated that the term "processor unit" as used herein is intended to include any processing device, such as, for example, one that includes a central processing unit (CPU) and/or other processing circuitry. It is also to be understood that the term "processor unit" may refer to more than one processing device and that various elements associated with a processing device may be shared by other processing devices.

The term "memory" as used herein is intended to include memory associated with a processor or CPU, such as, for example, random access memory (RAM), read only memory (ROM), a fixed memory device (e.g., hard disk drive), a removable memory device (e.g., diskette, compact disk, digital video disk or flash memory module), flash memory, non-volatile memory, etc. The memory may be considered a computer readable storage medium.

In addition, the phrase "input/output devices" or "I/O devices" as used herein is intended to include, for example, one or more input devices (e.g., keyboard, mouse, camera, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Figure 7:
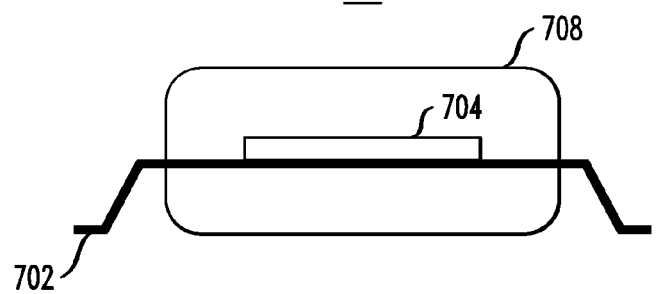
FIG. 7 is a cross-sectional view depicting an exemplary packaged integrated circuit comprising a compressive sampling unit according to an embodiment of the present invention.

At least a portion of the techniques of the present invention may be implemented in one or more integrated circuits. In forming integrated circuits, die are typically fabricated in a repeated pattern on a surface of a semiconductor wafer. Each of the die includes a device described herein, and may include other structures or circuits. Individual die are cut or diced from the wafer, then packaged as integrated circuits. FIG. 7 is a partial cross-sectional view depicting an exemplary packaged integrated circuit 700 comprising the compressive sampling unit 131 and/or at least one processor core/cs 311-318 and 411 according to an embodiment of the present invention. The packaged integrated circuit 700 comprises a leadframe 702, a die 704 attached to the leadframe, the die including a compressive sampling unit and/or processor core/cs in accordance with an embodiment of the invention, and a plastic encapsulation mold 708. One skilled in the art would know how to dice wafers and package die to produce integrated circuits. Integrated circuits so manufactured are considered part of this invention. Although FIG. 7 shows only one type of integrated circuit package, the invention is not so limited; the invention may comprise an integrated circuit die enclosed in any package type.

An integrated circuit in accordance with the present invention can be employed in any application and/or electronic system which utilize compressive sampling for obtaining information from a processor. Suitable systems for implementing the invention may include, but are not limited to, personal computers, communication networks, electronic commerce systems, portable communications devices (e.g., cell phones), solid-state media storage devices, etc. Systems incorporating such integrated circuits are considered part of this invention. Given the teachings of the invention provided herein, one of ordinary skill in the art will be able to contemplate other implementations and applications of the techniques of the invention.

Embodiments of the present invention may be contained within an integrated circuit or a plurality of integrated circuits. Alternately, the present invention can be fabricated using discrete circuit elements or a mix of discrete circuit elements and one or more integrated circuits.

Embodiments of the invention are described with relationship to a single multicore processor. The invention is not so limited and may apply to a multiple number of multicore processors.

Although illustrative embodiments of the invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method of gathering information from a processor, the method comprising the step of:
    compressive sampling of information from at least one processor core, wherein the compressive sampling produces compressed information, wherein the processor comprises the at least one processor core, and wherein the at least one processor core is operative to process data.

2. The method of claim 1, wherein the compressed information comprises a performance metric, wherein the performance metric is adapted to reflect the performance of the at least one processor core, and wherein the performance metric comprises one or more of cycles per instruction, bus usage, cache memory misses, branch misses, contents of counters within a performance monitor unit, and contents of the counters within the compressive sampling unit.

3. The method of claim 1, wherein a compressive sampling unit is operative to perform the compressive sampling, and wherein the compressive sampling unit comprises at least one of a circuit, a programmable circuit, a reprogrammable circuit, a field programmable gate array, a memory circuit, a circuit within the at least one processor core, at least part of the at least one processor core, a performance monitor unit, and a dedicated compressive sampling processor core.

4. The method of claim 3 further comprising the steps of:
    communicating of the compressed information to a scheduler;
    decompressing the compressed information by the scheduler; and
    scheduling of at least one task by the scheduler, wherein the at least one processor core is operative to run the at least one task.

5. The method of claim 4, wherein the at least one processor core comprises a plurality of processor cores, wherein the at least one task comprises a plurality of tasks, and wherein the scheduler is operative to assign the plurality of tasks to the plurality of processor cores to optimise the processing of the data.

6. The method of claim 3, wherein a compressive sampling software program is operative to perform the compressive sampling, and wherein the compressive sampling unit is operative to run the compressive sampling software program.

7. The method of claim 4, wherein the scheduler comprises at least one of a scheduler processor core, a scheduler circuit, a programmable scheduler circuit, a reprogrammable scheduler circuit, a scheduler memory circuit, and a scheduler field programmable gate array.

8. The method of claim 4, wherein a decompressing software program is operative to perform the decompressing, and wherein the scheduler is operative to run the decompressing software program.

9. The method of claim 4, wherein the processor further comprises at least one of the compressive sampling unit and a performance monitor unit.

10. The method of claim 1, wherein the compressive sampling of information comprises the steps of:
    obtaining data f wherein f comprises n elements in R space, each element indicated by $f_j$, wherein j goes from 1 to n inclusive;
    obtaining a sampling matrix A having k rows and n columns, wherein k is less than n; and wherein an $A*_j$ comprises a j-th column of a sampling matrix A;
    defining $a_j$ as equal to $A_{*j}$, wherein the $a_j$ comprises k elements, each of the k element indicated by $a_{ij}$, and wherein i goes from 1 to k inclusive;
    calculating d, wherein d comprises the compressed information, k elements in R space, and elements $d_i$, wherein the $d_i$ for i equal to 1 equals the product of the $a_{ij}$ and the $f_j$, wherein the $d_i$ for i inclusively between 2 and k equals the previous $d_i$ added to the product of the $a_{ij}$ and the $f_j$, wherein the previous $d_i$ is the $d_i$ for i=i−1, wherein the calculation of d comprises a j-calculation performed for each j, wherein the j-calculation performed for each j comprises an i-calculation performed for each i, and wherein i first equals 1 and then equals each integer in ascending sequence until i equals k.

11. The method of claim 10, wherein, at a first time, values in a register comprise values form only a first column of the matrix A, wherein, at a second time, values in the register comprise values form only a second column of the matrix A, wherein the values in the first column comprise a first part of a pseudo random number sequence, and wherein the values in the second column comprise a second part of the pseudo random number sequence.

12. An apparatus for gathering information from a processor, the apparatus comprising:
    a processor comprising at least one processor core, wherein the at least one processor core is operative to process data; and
    a compressive sampling unit, wherein the compressive sampling unit is operative to perform compressive sampling of information from the at least one processor core, and wherein the compressive sampling unit produces compressed information.

13. The apparatus of claim 12 further comprising:
    a scheduler, wherein the scheduler is operative to receive the compressed information, wherein the scheduler is operative to decompress the compressed information, wherein the scheduler is operative to scheduling at least one task, and wherein the at least one processor core is operative to run the at least one task.

14. The apparatus of claim 12, wherein the compressed information comprises a performance metric, wherein the performance metric is adapted to reflect the performance of the at least one processor core, wherein the performance metric comprises one or more of cycles per instruction, bus usage, cache memory misses, branch misses, contents of counters within a performance monitor unit, and contents of the counters within the compressive sampling unit.

15. The apparatus of claim 12, wherein the compressive sampling unit comprises at least one of a circuit, a programmable circuit, a reprogrammable circuit, a field programmable gate array, a memory circuit, a circuit within the at least one processor core, at least part of the at least one processor core, a performance monitor unit, and a dedicated compressive sampling processor core.

16. The apparatus of claim 13, wherein the at least one processor core comprises a plurality of processor cores, wherein the at least one task comprises a plurality of tasks, and wherein the scheduler is operative to assign the plurality of tasks to the plurality of processor cores to optimise the processing of the data.

17. The apparatus of claim 12, wherein a compressive sampling software program is operative to perform the compressive sampling, and wherein the compressive sampling unit is operative to run the compressive sampling software program.

18. The apparatus of claim 13, wherein the scheduler comprises at least one of a scheduler processor core, a scheduler circuit, a programmable scheduler circuit, a reprogrammable scheduler circuit, a scheduler memory circuit, and a scheduler field programmable gate array.

19. The apparatus of claim 13, wherein a decompressing software program is operative to perform the decompressing of the compressed information, and wherein the scheduler is operative to run the decompressing software program.

20. The apparatus of claim 12, wherein the processor further comprises at least one of the compressive sampling unit and a performance monitor unit.

21. The apparatus of claim 13, wherein an integrated circuit comprises at least one of the processor the compressive sampling unit and the scheduler.

22. The apparatus of claim 12, wherein the compressive sampling of information comprises the steps of:
- obtaining data f wherein f comprises n elements in R space, each element indicated by $f_j$, wherein j goes from 1 to n inclusive;
- obtaining a sampling matrix A having k rows and n columns, wherein k is less than n; and wherein an $A_{*j}$ comprises a j-th column of a sampling matrix A;
- defining $a_j$ as equal to $A_{*j}$, wherein the $a_j$ comprises k elements, each of the k element indicated by $a_{ij}$, and wherein i goes from 1 to k inclusive;
- calculating d, wherein d comprises the compressed information, k elements in R space, and elements $d_i$, wherein the $d_i$ for i equal to 1 equals the product of the $a_{ij}$ and the $f_j$, wherein the $d_i$ for i inclusively between 2 and k equals the previous $d_i$ added to the product of the $a_{ij}$ and the $f_j$, wherein the previous $d_i$ is the $d_i$ for i=i−1, wherein the calculation of d comprises a j-calculation performed for each j, wherein the j-calculation performed for each j comprises an i-calculation performed for each i, wherein i first equals 1 and then equals each integer in ascending sequence until i equals k.

23. The apparatus of claim 22, wherein, at a first time, values in a register comprise values form only a first column of the matrix A, wherein, at a second time, values in the register comprise values form only a second column of the matrix A, wherein the values in the first column comprise a first part of a pseudo random number sequence, and wherein the values in the second column comprise a second part of the pseudo random number sequence.

24. Apparatus for gathering information form a processor, the apparatus comprising:
- a memory; and
- a processor unit coupled to the memory, wherein the processor unit comprises at least on processor core, wherein the processor unit is configured to obtain information from at least the one processor core, wherein the information is obtained using compressive sampling, wherein the compressive sampling produces compressed information, and wherein the at least one processor core is operative to process data.

25. An article of manufacture for gathering information from a processor, the article comprising a computer readable storage medium having one or more programs embodied therewith, wherein the one or more programs, when executed by a computer, perform step of:
- compressive sampling of information from at least one processor core, wherein the compressive sampling produces compressed information, wherein the processor comprises the at least one processor core, and wherein the at least one processor core is operative to process data.

* * * * *